United States Patent
Aramaki et al.

(10) Patent No.: US 10,021,269 B2
(45) Date of Patent: Jul. 10, 2018

(54) IMAGE CORRECTION DEVICE, IMAGE CORRECTION SYSTEM, IMAGE CORRECTION METHOD

(71) Applicant: Mitsubishi Electric Corporation, Chiyoda-ku (JP)

(72) Inventors: Toru Aramaki, Chiyoda-ku (JP); Akira Ota, Chiyoda-ku (JP); Koichi Hirai, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/533,784

(22) PCT Filed: Dec. 15, 2015

(86) PCT No.: PCT/JP2015/085015
§ 371 (c)(1),
(2) Date: Jun. 7, 2017

(87) PCT Pub. No.: WO2016/111120
PCT Pub. Date: Jul. 14, 2016

(65) Prior Publication Data
US 2017/0346988 A1    Nov. 30, 2017

(30) Foreign Application Priority Data
Jan. 5, 2015    (JP) ................................ 2015-000118

(51) Int. Cl.
*H04N 1/04*    (2006.01)
*H04N 1/401*    (2006.01)
(Continued)

(52) U.S. Cl.
CPC ........... *H04N 1/401* (2013.01); *H04N 1/0473* (2013.01); *H04N 1/2034* (2013.01); *H04N 2201/0081* (2013.01)

(58) Field of Classification Search
CPC .... H04N 1/401; H04N 1/0473; H04N 1/2034; H04N 2201/0081
(Continued)

(56) References Cited

U.S. PATENT DOCUMENTS 5,430,550 A * 7/1995 Hashimoto ............ H04N 1/047
358/488
6,728,008 B1    4/2004 Kamisuwa
(Continued)

FOREIGN PATENT DOCUMENTS

JP    2000-83144 A    3/2000
JP    2003-173109 A    6/2003
(Continued)

OTHER PUBLICATIONS

International Search Report dated Mar. 1, 2016 in PCT/JP2015/085015, filed Dec. 15, 2015.

*Primary Examiner* — Houshang Safaipour
(74) *Attorney, Agent, or Firm* — Oblon, McClelland, Maier & Neustadt, L.L.P.

(57) ABSTRACT

A read sensor generates front side image information indicating an image on a front side of an object to be read, and front side measurement information indicating a line of an image in a main scanning direction on the front side of a correction chart. A read sensor generates back side image information indicating an image on a back side of the object to be read, and back side measurement information indicating a line of an image in the main scanning direction on the back side of the correction chart. The image correction device calculates an amount of misalignment of read positions based on the front side measurement information and the back side measurement information, and corrects misalignment of images on the front side and the back side of (Continued)

the object to be read, indicated by the front side image information and the back side image information.

20 Claims, 4 Drawing Sheets

(51) Int. Cl.
*H04N 1/047* (2006.01)
*H04N 1/203* (2006.01)
(58) Field of Classification Search
USPC .................................................. 358/494, 474
See application file for complete search history.

(56) References Cited

U.S. PATENT DOCUMENTS

| | | | |
|---|---|---|---|
| 7,139,441 B2 * | 11/2006 | Aihara | ................. G06K 9/3283 |
| | | | 382/298 |
| 8,437,032 B2 * | 5/2013 | Kakigi | ................. G06T 3/4007 |
| | | | 358/1.2 |

FOREIGN PATENT DOCUMENTS

| | | |
|---|---|---|
| JP | 2006-345367 A | 12/2006 |
| JP | 2009-71779 A | 4/2009 |
| JP | 2012-165220 A | 8/2012 |

* cited by examiner

IMAGE CORRECTION DEVICE, IMAGE CORRECTION SYSTEM, IMAGE CORRECTION METHOD

TECHNICAL FIELD

The present disclosure relates to an image correction device, an image correction system, and an image correction method for reading a front and back of an object to be read.

BACKGROUND ART

Image reading devices for use in banking terminal devices, such as check readers, bill counters, bill sorters, and automated teller machines (ATMs), read, as electrical information, security information printed or imprinted on media such as bills, checks, and securities, and, based on the read information, determine a monetary amount or perform authentication.

One method for converting information of such a medium, which is an object to be read, into electrical information is to convert a two-dimensional image into an electrical signal, such as in a digital camera. Another method is to use a linear sensor. The linear sensor is an array of photoelectric conversion elements arranged to have the same width as the medium. The linear sensor obtains a one-dimensional image by illuminating the medium and passing the light reflected by the illuminated medium through a lens array to form an image, and then obtains a two-dimensional image by movement of the medium in a direction perpendicular to the array of photoelectric conversion elements. The method of using the linear sensor leads to size reduction of the overall device and is thus commonly adopted.

When the object to be read includes different information on the front and back, both the front and back image information are needed to improve the accuracy in reading of the object to be read. However, double-sided reading with a single sensor by reversing the paper money takes additional time for conveyance, and also takes twice the processing time for a single object to be read, compared with the processing time taken for single-sided reading. Moreover, arrangement of more space is required to provide a conveyance path for reversing the front-back of the object to be read, and such arrangement is not suitable for reduction in size. Thus, another arrangement is adopted for double-sided reading in one conveyance, in which a sensor for reading the front and a sensor for reading the back are provided. For more sophisticated identification, print misregistration between the front and back and positioning of a watermark image using a transmission light source can be adjusted by synthesis of front and back image information and processing of the image.

Patent Literature 1 discloses a correction method for an image reading device that calculates an amount of reading distortion for each read position within a read area by comparison between correction patterns and that corrects the reading distortion of image data based on the calculated amount of reading distortion.

Patent Literature 2 discloses an image formation device for alignment of front and back images by eliminating not only misalignment due to shift of front and back images but also deviations of magnifications of the images due to expansion and contraction of recording paper.

Patent Literature 3 discloses a correction method for measurement of a distance between any two positions on an image of a document based on image data obtained by reading the image of the document. This method for an image measurement device involves calculating a value of difference between actual measurement values of positions of specific points on a specific pattern of a correction chart and positions of the specific points from image data obtained by reading the correction chart. Then the measurement of the distance between any two positions on the image of the document is corrected based on the data of the value of difference.

CITATION LIST

Patent Literature

Patent Literature 1: Unexamined Japanese Patent Application Kokai Publication No. 2012-165220
Patent Literature 2: Unexamined Japanese Patent Application Kokai Publication No. 2003-173109
Patent Literature 3: Unexamined Japanese Patent Application Kokai Publication No. 2006-345367

SUMMARY OF INVENTION

Technical Problem

In the above-described techniques of using two image sensors for front and back reading, in a case in which actual read positions of the image sensors are misaligned due to variations in mounting position of each image sensor, when front and back images each obtained by the corresponding image sensor are synthesized, misalignment occurs between the two images. This reduces identification accuracy. In addition, the variations in mounting positions vary among individual image sensors. Thus accurate recognition of the variations may require expensive measurement device or additional measurement time, and measurement for each individual image sensor may be required.

None of Patent Literatures 1 to 3 discloses the correction method involving correcting misalignment of read positions in a case in which both the front and back of the object to be read are read in a single pass and the images are synthesized.

The present disclosure has been made to solve the above problems, and an objective of the present disclosure is to improve an identification accuracy of an image and reduce an increase in cost, in a case in which both the front and back of the object to be read are read in a single pass and the images are synthesized.

Solution to Problem

To achieve the foregoing objective, an image correction device according to the present disclosure connects to a first read sensor and a second read sensor. The first read sensor reads a line of an image in a main scanning direction on a front side of an object to be read or a correction chart, and generates front side read information for the object to be read or the correction chart, which indicates the line of the image in the main scanning direction on the front side of the object to be read or the correction chart. The second read sensor reads a line of an image in the main scanning direction on a back surface of the object to be read or the correction chart, and generates back side read information of the object to be read or the correction chart, which indicates the line of the image in the main scanning direction on the back side of the object to be read or the correction chart. The image correction device includes a misalignment amount calculator and a corrector. The misalignment amount calculator calculates an amount of misalignment of read positions of the first read sensor and the second read sensor based on the front side read information of the correction chart and the back side read information of the correction chart, referring to the correction chart information that indicates figures of the correction chart. The misalignment amount calculator then generates correction information that indicates the calculated amount of misalignment. The corrector corrects, using the correction information generated by the misalignment amount calculator, misalignment of images on the front side and the back side of the object to be read, indicated by the front side read information of the object to be read and the back side read information of the object to be read. The correction chart includes, at a same position on both the front side and the back side, the figures including straight line segments parallel to a sub-scanning direction and oblique line segments inclined, with respect to the straight line segments, at a determined angle in the main scanning direction. The misalignment amount calculator calculates the amount of misalignment of the read positions in the sub-scanning direction from a distance between a pixel corresponding to the straight line segment of the front side read information and a pixel corresponding to the oblique line segment of the front side read information, a distance between a pixel corresponding to the straight line segment of the back side read information and a pixel corresponding to the oblique line segment of the back side read information, and an inclination angle of each of the oblique line segments.

Advantageous Effects of Invention

According to the present disclosure, correction of misalignment of read positions on the front and back of the object to be read using the correction chart enables improvement of an identification accuracy of the image and reduction of an increase in cost, in a case in which both the front and back of the object to be read are read and then the images are synthesized.

DESCRIPTION OF EMBODIMENTS

Hereinafter, embodiments of the present disclosure are described in detail with reference to the drawings. The same or similar parts are designated by the same reference signs throughout the drawings. In the embodiments, examples of an object to be read includes media, such as bills, checks, and securities, including, as information, figures, patterns, or the like used in determination of the monetary amounts and authentication.

Figure 1:
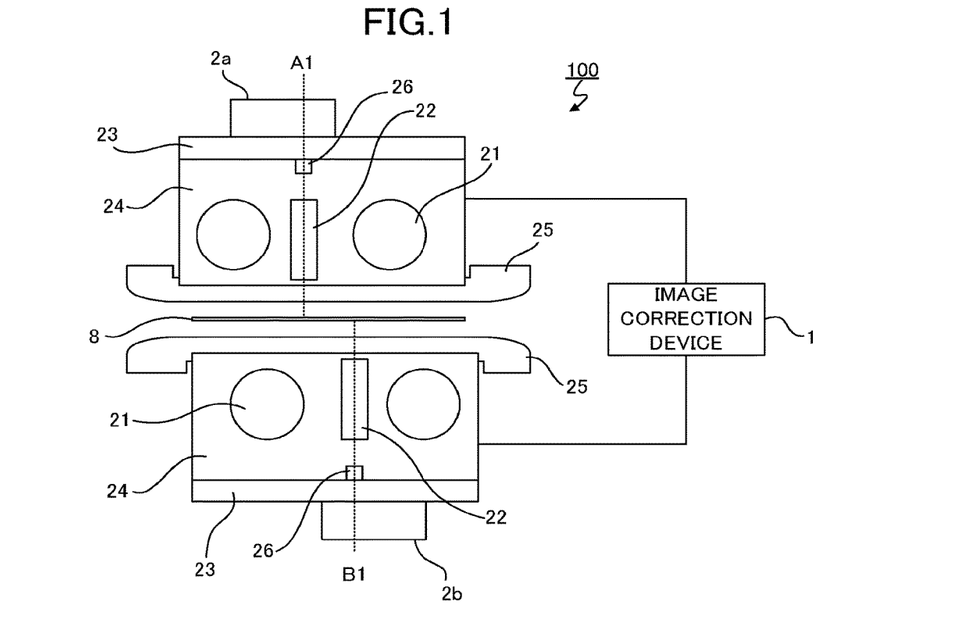
FIG. 1 is a drawing illustrating an example configuration of an image correction system according to an embodiment of the present disclosure.

FIG. 1 is a drawing illustrating an example configuration of an image correction system according to an embodiment of the present disclosure. An image correction system 100 includes a read sensor 2a for reading a front side of an object to be read 8, a read sensor 2b for reading a back side of the object to be read 8, and an image correction device 1 connected to the read sensor 2a and the read sensor 2b. The image correction device 1 may be implemented as an image corrector 1 within at least one of the read sensor 2a or the read sensor 2b. In such arrangement, however, the image correction device 1 (image corrector 1) can be considered to be connected to the read sensor 2a and the read sensor 2b. Of course, the image corrector 1 can be referred to as the image correction device 1 when formed within at least one of the read sensor 2a or the read sensor 2b.

The read sensor 2a and the read sensor 2b have the same structure. However, when only one of the read sensors 2a and 2b includes the image corrector 1, both of the read sensors 2a and 2b do not have exactly the same structure. The read sensor 2a and the read sensor 2b each include light guides 21 for irradiating the object to be read 8 with light, a lens 22 for collecting light scattered by the object to be read 8, a sensor board 23 having electrical components mounted thereon, a structure component frame 24 for enclosing internal components and blocking main light, a conveyance side plate 25 disposed at the object to be read 8 movement side, and a sensor IC 26 for conversion of a light signal into an electrical signal. When the image corrector 1 is implemented within at least one of the read sensor 2a or the read sensor 2b, the image corrector 1 may be mounted within the sensor IC 26 or on the sensor board 23. Of course, the image corrector 1 may be mounted on another circuit board.

FIG. 1 illustrates a cross sectional view of the read sensor 2a, the read sensor 2b, and the object to be read 8, taken along the line perpendicular to the main scanning direction and parallel to the sub-scanning direction. A read position of the read sensor 2a is a point of intersection of a read axis A1 and the object to be read 8. A read position of the read sensor 2b is a point of intersection of a read axis B1 and the object to be read 8. The read sensor 2a and the read sensor 2b, which are line sensors, read a line of an image at the read position on the front side of the object to be read 8 and a line of an image at the read position on the back side of the object to be read 8, respectively, and the lines of the images (hereinafter referred to as a read line A2 and a read line B2) extend in the main scanning direction and are located at the same distance from the respective read starting positions. The read sensor 2a generates front side read information indicating the read line A2 of the object to be read 8. The read sensor 2b generates back side read information indicating the read line B2 of the object to be read 8. If differences between the distances from the read starting positions to the read positions are previously known, the read line A2 and the read line B2 may be the lines of the images extending in the main scanning direction on the front side and the back side of the object to be read and located at different distances from the read starting positions. Reading of the lines of the images in the main scanning direction located at the same distance from the read starting position enables a decrease of computational loads.

The read sensor 2a reads the read lines A2 sequentially while the object to be read 8 is moved in the sub-scanning direction at a predetermined speed, and then reads the entire image on the front side of the object to be read 8. Similarly, the read sensor 2b reads the read lines B2 sequentially, and reads the entire image on the back side of the object to be read 8. The conveyor mechanism for moving the object to be read 8 is omitted in FIG. 1. The read sensor 2a generates front side image information indicating an image on the front side of the object to be read 8 from the front side read information of the object to be read 8, and transmits the front side image information to the image correction device 1. The read sensor 2b generates back side image information indicating an image on the back side of the object to be read 8 from the back side read information of the object to be read 8, and transmits the back side image information to the image correction device 1. Alternatively, the read sensor 2a may transmit the front side read information of the object to be read 8 to the image correction device 1 and the read sensor 2b may transmit the back side read information of the object to be read 8 to the image correction device 1, and then the image correction device 1 may generate the front side image information and the back side image information.

A fixed distance is provided between the read position and a sensor for detecting a presence or absence of the object to be read 8 when the object to be read 8 passes through the read position while being conveyed. Each of the read sensor 2a and the read sensor 2b starts reading when the object to be read 8 is conveyed a predetermined distance after detection of a leading edge of the object to be read 8, and continues reading until the object to be read 8 is conveyed a predetermined distance after detection of the trailing edge. The read images are misaligned by an amount of the error of the mounting positions of the read sensor 2a and the read sensor 2b from design values. The image correction device 1 corrects the misalignment of the images, received from the read sensor 2a and the read sensor 2b, on the front side and back side of the object to be read 8.

Figure 2:
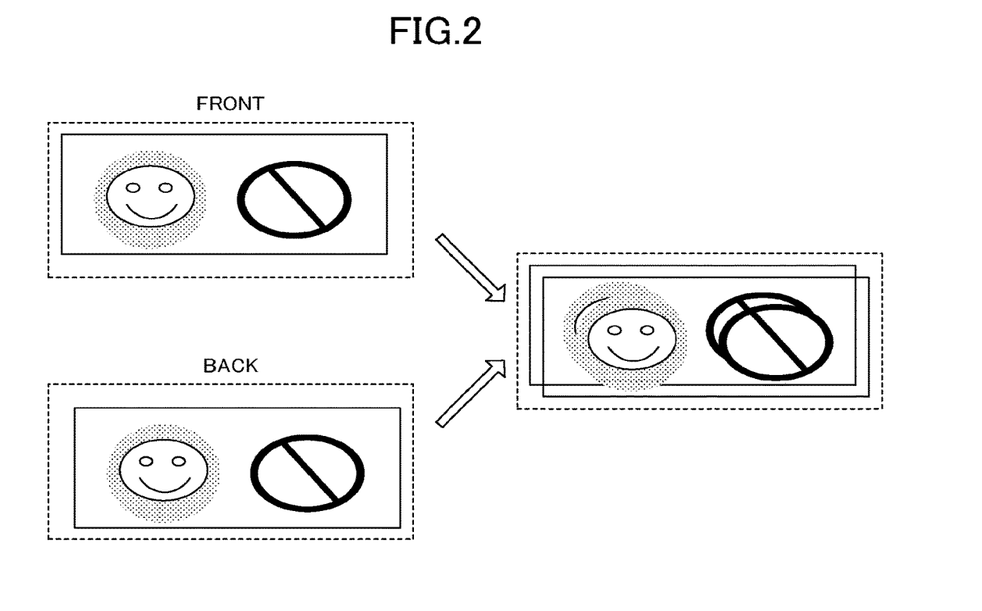
FIG. 2 is a drawing illustrating an example of synthesis of front side image information and back side image information without correction according to the embodiment.

FIG. 2 is a drawing illustrating an example of synthesis of front side image information and back side image information without correction according to the embodiment. FIG. 2 illustrates an image area by dashed lines. In a case in which there is an error of the mounting positions of the read sensor 2a and the read sensor 2b from the design values, and the read positions are misaligned, when the image areas of the front side image information and the back side image information are synthesized, the images on the front side and the back side of the object to be read 8 are misregistered as illustrated in FIG. 2. This reduces the identification accuracy. To address this, the image correction device 1 calculates the amounts of misalignment of the read positions of the read sensor 2a and the read sensor 2b using the correction chart, and corrects the images on the front side and the back side of the object to be read 8.

Figure 3:
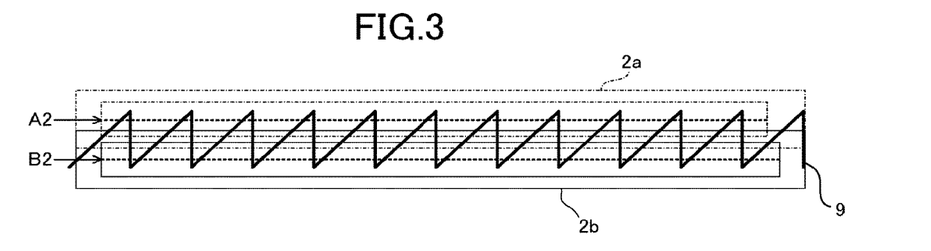
FIG. 3 is a drawing illustrating an example of a correction chart according to the embodiment.

FIG. 3 is a drawing illustrating an example of the correction chart according to the embodiment. If pixel pitches of the read sensor 2a and the read sensor 2b have sizes that permit variations caused due to a semiconductor manufacturing precision to be negligible, the amount of misalignment of the read positions of the read sensor 2a and the read sensor 2b can be calculated using the correction chart 9. In the correction chart 9, the same figures are printed on both the front and back so as to be mirror images at a specified dimension as illustrated in FIG. 3. The correction chart 9 has a line thickness defined in accordance with the pixel pitches of the read sensor 2a and the read sensor 2b. In an example of FIG. 3, the correction chart 9 is a line extending in the main scanning direction and including line segments of the same length parallel to the sub-scanning direction and inclined line segments, with both the types of line segments intersecting one another to form a series of line segments. The correction chart 9 is not limited to this configuration, but may have a figure including at least line segments parallel to the sub-scanning direction and inclined line segments lying in the main scanning direction.

If printed figures on the front side and the back side of the correction chart 9 are in register, the amount of computation for the image correction device 1 to calculate the amounts of misalignment of the read positions of the read sensor 2a and the read sensor 2b can be reduced. If the printed figures on the front side and the back side are not in register, the image correction device 1 may store the print positions (or difference) of the figures on the front side and the back side of the image correction device 1, and when calculating the amounts of misalignment of the read positions of the read sensor 2a and the read sensor 2b, may perform computation taking the stored print positions into consideration.

After reading the correction chart 9, the read sensor 2a generates the front side read information indicating the read line A2 of the correction chart 9, and the read sensor 2b generates the back side read information indicating the read line B2 of the correction chart 9. The read sensor 2a transmits, to the image correction device 1, front side measurement information that is the front side read information indicating the read line A2 located at a predetermined position on the correction chart 9. The read sensor 2b transmits, to the image correction device 1, back side measurement information that is the back side read information indicating the read line B2 located at a predetermined position of the correction chart 9. The predetermined positions are positions in which both the read line A2 and the read line B2 include pixels corresponding to the line of the correction chart 9.

Figure 4:
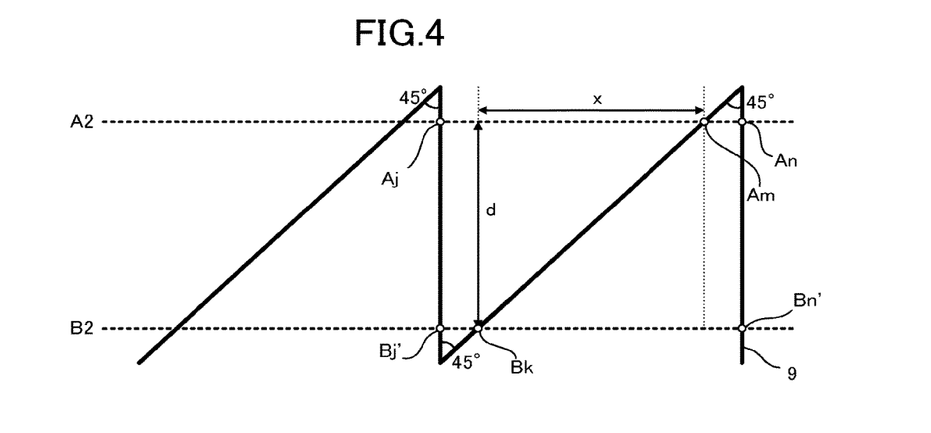
FIG. 4 is an example of a misalignment amount calculation method according to the embodiment.

FIG. 4 is an example of a misalignment amount calculation method according to the embodiment. FIG. 4 is a diagram illustrating a portion of the correction chart 9. The image correction device 1 pre-stores the correction chart information indicating the figure of the correction chart 9. The correction chart information may be an image of the figure of the correction chart 9 or may be a value indicating a length of the line segments constituting the figure of the correction chart 9, a distance between the line segments, or an inclination angle of the line segments. Upon receiving the front side measurement information from the read sensor 2a and the back side measurement information from the read sensor 2b, the image correction device 1 obtains, from the front side measurement information, position information of the jth pixel Aj, position information of the mth pixel Am, and position information of nth pixel An, all of which correspond to the line of the correction chart 9 on the read line A2. Similarly, the image correction device 1 obtains, from the back side measurement information, position information of the j'th pixel Bj', position information of the kth pixel Bk, and position information of the n'th pixel Bn', all of which correspond to the line of the correction chart 9 on the read line B2.

The method for calculating the amount of misalignment in the main scanning direction is described. Without the misalignment in the main scanning direction, j=j' and n=n'. Accordingly, the image correction device 1 can calculate the amount of misalignment of the read positions in the main scanning direction from a difference between the position of the pixel Aj and the position of the pixel Bj' and a difference between the position of the pixel An and the position of the pixel Bn'.

Next, the method for calculating the amount of misalignment in the sub-scanning direction is described. The image correction device 1 can determine a distance (Aj–Am) between the pixel Aj and the pixel Am and a distance (Am–An) between the pixel Am and the pixel An. Similarly, the image correction device 1 can determine a distance (Bj'–Bk) between the pixel Bj' and the pixel Bk and a distance (Bk–Bn') between the pixel Bk and the pixel Bn'. Then the image correction device 1 can determine a distance x from a difference between the distance (Aj–Am) and the distance (Bj'–Bk) and a difference between the distance (Bk–Bn') and the distance (Am–An).

In an example of FIG. 4, the inclination angle of the inclined line segments constituting the correction chart 9 is set to 45°, and thus the distance x is the same as the distance d between the read line A2 and the read line B2. Thus the image correction device 1 can calculate the distance d, that is, the amount of misalignment of the read positions in the sub-scanning direction, by determining the distance x. The inclination angle of the inclined line segments is not limited to 45°. As long as the distance from the leading edge of the correction chart 9 to the read line A2 and the read line B2 can be calculated, the inclination angles of the inclined line segments on the front side and the back side may be different.

Figure 5:
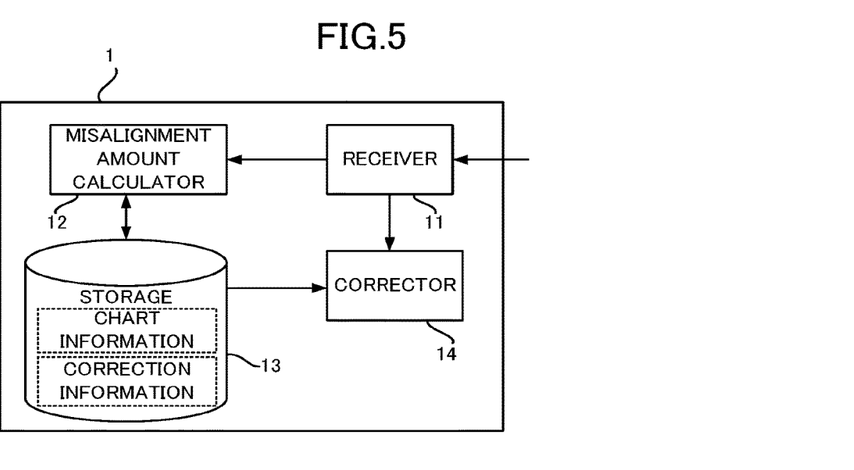
FIG. 5 is a drawing illustrating an example of functional configuration of an image correction device according to the embodiment.

FIG. 5 is a drawing illustrating an example of functional configuration of the image correction device according to the embodiment. The image correction device 1 includes a receiver 11, a misalignment amount calculator 12, a storage 13, and a corrector 14. The receiver 11 receives the front side image information and the front side measurement information from the read sensor 2a and the back side image information and the back side measurement information from the read sensor 2b. The receiver 11 sends the received front side measurement information and the received back side measurement information to the misalignment amount calculator 12. The receiver 11 sends the received front side image information and the received back side image information to the corrector 14.

Upon receiving the front side measurement information and the back side measurement information from the receiver 11, the misalignment amount calculator 12 reads the correction chart information from the storage 13, and calculates the amounts of misalignment of the read positions of the read sensor 2a and the read sensor 2b using the calculation method as described above. The misalignment amount calculator 12 generates correction information indicating the calculated amounts of misalignment of the read positions, and stores the correction information in the storage 13.

Upon receiving the front side image information and the back side image information from the receiver 11, the corrector 14 reads the correction information stored in the storage 13, and corrects the misalignment of the images on the front side and the back side of the object to be read 8.

Figure 6:
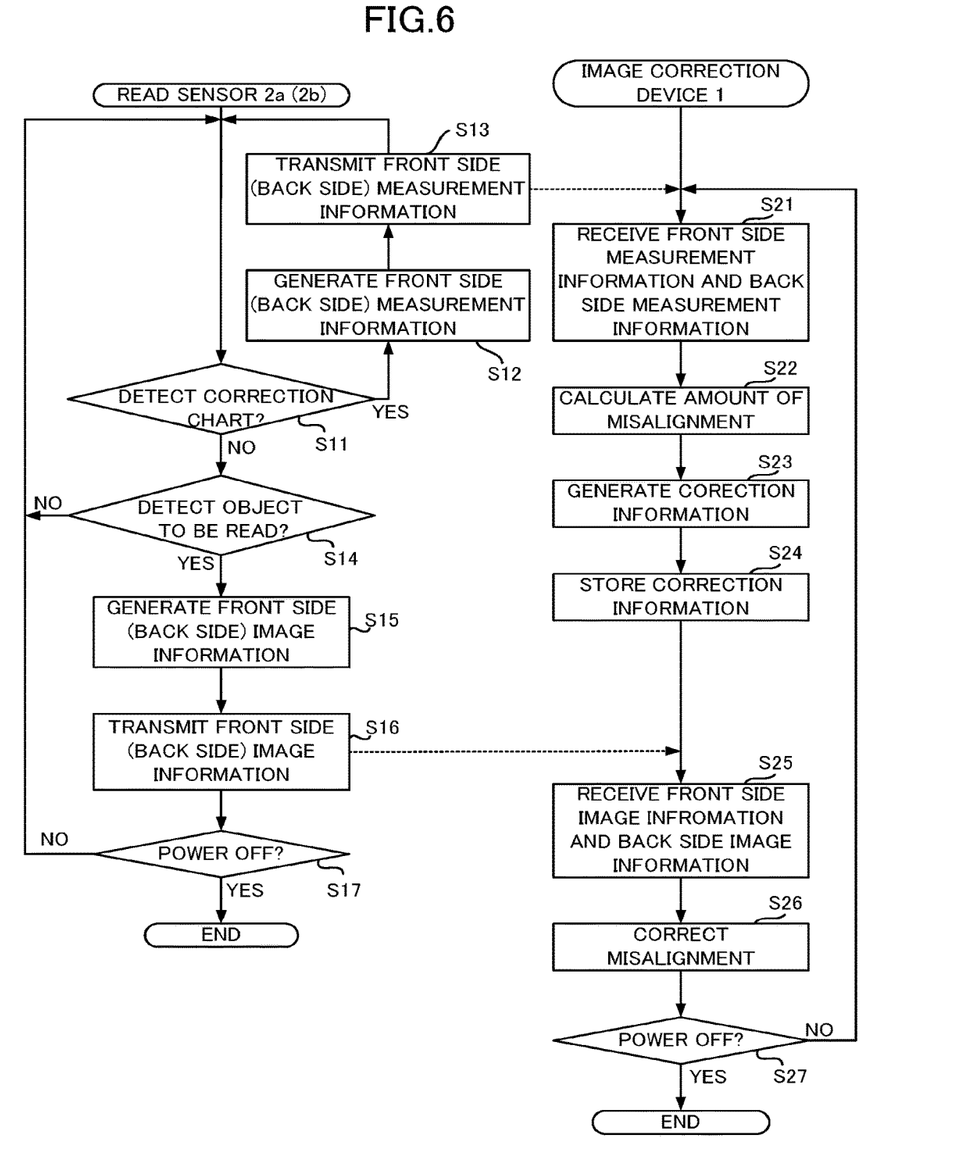
FIG. 6 is a flowchart illustrating an example of an operation of an image correction process according to the embodiment.

FIG. 6 is a flowchart illustrating an example of an operation of an image correction process according to the embodiment. The image correction process starts upon power-up of the read sensor 2a and the read sensor 2b and the image correction device 1. The process performed by the read sensor 2b is illustrated in parentheses in the flowchart since the read sensor 2a and the read sensor 2b follow the same process.

Upon detecting the correction chart 9 (YES in Step S11), the read sensor 2a (read sensor 2b) reads the correction chart 9 and then generates the front side (back side) measurement information (Step S12). The read sensor 2a (read sensor 2b) transmits the generated front side (back side) measurement information to the image correction device 1 (Step S13).

The receiver 11 of the image correction device 1 receives the front side measurement information from the read sensor 2a and the back side measurement information from the read sensor 2b (Step S21). The receiver 11 sends the received front side measurement information and the received back side measurement information to the misalignment amount calculator 12. The misalignment amount calculator 12 reads the correction chart information from the storage 13, and calculates the amounts of misalignment of the read positions of the read sensor 2a and the read sensor 2b from the read line A2 indicated by the front side measurement information received from the receiver 11 and the read line B2 indicated by the back side measurement information received from the receiver 11 (Step S22). The misalignment amount calculator 12 generates the correction information indicating the calculated amounts of misalignment of the read positions (Step S23), and stores the correction information in the storage 13 (Step S24).

When the read sensor 2a (read sensor 2b) does not detect the correction chart 9 or the object to be read 8 (NO in Step S11 and NO in Step S14), the read sensor 2a (read sensor 2b) waits for detection of the correction chart 9 or the object to be read 8, repeating Step S11 and Step S14. Upon detecting the object to be read 8 (YES in Step S14), the read sensor 2a (read sensor 2b) reads the object to be read 8 and generates the front side (back side) image information (Step S15). The read sensor 2a (read sensor 2b) transmits the generated front side (back side) image information to the image correction device 1 (Step S16). When the power is not turned off (NO in Step S17), the process returns to Step S11, and Step S11 to Step S17 are repeated. When the power is off (YES in Step S17), the read sensor 2a (read sensor 2b) completes the process.

The receiver 11 of the image correction device 1 receives the front side image information from the read sensor 2a and the back side image information from the read sensor 2b (Step S25). The receiver 11 sends the received front side image information and the received back side image information to the corrector 14. When the corrector 14 receives the front side image information and the back side image information from the receiver 11, the corrector 14 reads the correction information stored in the storage 13, and then corrects misalignment of the images on the front side and the back side of the object to be read 8 (Step S26). When the power is not turned off (NO in Step S27), the process returns to Step S21, and Step S21 to Step S27 are repeated. When the power is off (YES in Step S27), the image correction device 1 completes the process.

As described above, the image correction system 100 according to the embodiment, correction of misalignment of the read positions of the read sensor 2a and the read sensor 2b using the correction chart 9 improves the identification accuracy of the image and reduces an increase in cost. The image correction system 100 according to the embodiment reads both the front and back of the object to be read 8 in a single pass with the read sensor 2a and the read sensor 2b, and synthesizes the images.

Figure 7:
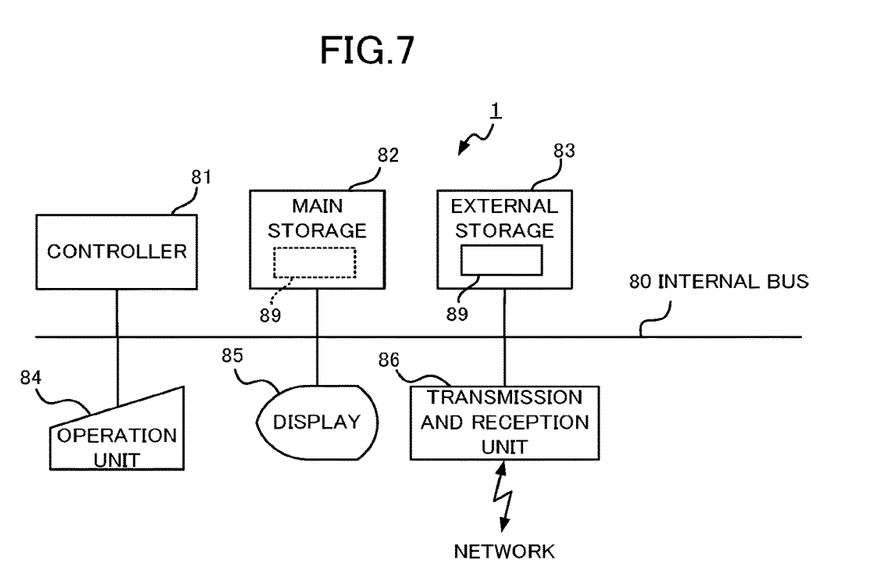
FIG. 7 is a block diagram illustrating an example of a hardware structure of the image correction device according to the embodiment.

FIG. 7 is a block diagram illustrating an example of a hardware structure of the image correction device according to the embodiment. The image correction device 1 includes, as illustrated in FIG. 7, a controller 81, a main storage 82, an external storage 83, an operation unit 84, a display 85, and a transmission and reception unit 86. The main storage 82, the external storage 83, the operation unit 84, the display 85, and the transmission and reception unit 86 are all connected to the controller 81 via an internal bus 80.

The controller 81 includes a central processing unit (CPU) or the like, and performs a process for each of the misalignment amount calculator 12 and the corrector 14 of the image correction device 1 in accordance with a control program 89 stored in the external storage 83

The main storage 82 includes random-access memory (RAM) or the like. The main storage 82, in which the control program 89 stored in the external storage 83 is loaded, is used as a work area of the controller 81.

The external storage 83 includes non-volatile memory including flash memory, a hard disk, DVD-RAM, DVD-RW, and the like, and pre-stores a program for causing the controller 81 to perform the process for the image correction device 1. The external storage 83 is caused to provide data included in the program to the controller 81 in accordance with a command of the controller 81, and stores data provided by the controller 81. The storage 13 is included in the external storage 83.

The operation unit 84 includes a keyboard, a pointing device, such as a mouse, and the like, and an interface device for connection of the keyboard, the pointing device, and the like to the internal bus 80. When a user enters information directly into the image correction device 1, the entered information is provided to the controller 81 via the operation unit 84.

Examples of the display 85 include a cathode ray tube (CRT) and a liquid crystal display (LCD). The display 85 displays an operation screen when a user enters information directly into the image correction device 1.

The transmission and reception unit 86 includes a network termination device, or a wireless communication device for connection to a network, and a serial interface or a local area network (LAN) interface for connection to the devices. The transmission and reception unit 86 functions as the receiver 11.

The processes for the receiver 11, the misalignment amount calculator 12, the storage 13, and the corrector 14 of the image correction device 1 as illustrated in FIG. 5 are performed by the control program 89 using, as resources, the controller 81, the main storage 82, the external storage 83, the operation unit 84, the display 85, the transmission and reception unit 86, and the like.

The hardware structure and the flowchart as above are merely examples, and any variation and modification are possible. Another example hardware structure may include the image corrector 1 implemented in each of the read sensor 2a and the read sensor 2b. In this case, two read sensors having the same structure are used for the read sensor 2a and the read sensor 2b, and thus designing and manufacturing of the read sensors having different structures are not necessary, which reduces an increase in cost. Use of only one of the image correctors 1 is sufficient when the image corrector 1 is mounted on each of the read sensor 2a and the read sensor 2b. Of course, both the image correctors 1 may be used. This enables reduction in the processing load of each of the two image correctors 1.

The system mainly performing processes of the image correction device 1, including the controller 81, the main storage 82, the external storage 83, the operation unit 84, the display 85, the transmission and reception unit 86, the internal bus 80, and the like, is not limited to the dedicated system, but can be implemented using a typical computer system. For example, computer programs for execution of the above-described processes, which are stored in a computer-readable recording medium (a flexible disk, a CD-ROM, a DVD-ROM, etc.) for distribution, may be installed in a computer to implement the image correction device 1 that executes the above-described operations. Alternatively, such computer programs, which are stored in a storage device included in a server device on a communication network, such as the Internet, may be downloaded or otherwise installed in a typical computer system to implement the image correction device 1.

Alternatively, when the functions of the image correction device 1 are implemented by an operating system (OS) and application programs, both of which have respective separate roles or cooperate with each other, or in other situations, only the application programs may be stored in the recording medium or the storage device.

Alternatively, computer programs may be superimposed onto a carrier wave for delivery via a communication network. For example, the computer program may be uploaded to a bulletin board system (BBS) on a communication network, and delivered via a network. The above-described processes may be executed by starting the computer programs and running the computer programs under the control of the OS in a manner similar to other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2015-000118, filed on Jan. 5, 2015, including the specification, claims, drawings, and abstract, the entire disclosure of which is incorporated by reference herein.

INDUSTRIAL APPLICABILITY

The present disclosure is applicable to, for example, an image correction device for reading a front and back of an object to be read.

REFERENCE SIGNS LIST

1 Image correction device (image corrector)
2a, 2b Read sensor
8 Object to be read
9 Correction chart
11 Receiver
12 Misalignment amount calculator
13 Storage
14 Corrector
21 Light guide
22 Lens
23 Sensor board
24 Structure component frame
25 Conveyance side plate
26 Sensor IC
80 Internal bus
81 Controller
82 Main storage
83 External storage 84 Operation unit
85 Display
86 Transmission and reception unit
89 Control program
100 Image correction system
A1, B1 Read axis
A2, B2 Read line
Aj, Am, An, Bj', Bk, Bn' Pixel

The invention claimed is:

1. An image correction device configured to be connected to a first read sensor and a second read sensor, the first read sensor reading a line of an image in a main scanning direction on a front side of an object to be read or a correction chart and generating front side read information for the object to be read or the correction chart, the front side read information indicating the line of the image in the main scanning direction on the front side of the object to be read or the correction chart, the second read sensor reading a line of an image in the main scanning direction on a back side of the object to be read or the correction chart and generating back side read information for the object to be read or the correction chart, the back side read information indicating the line of the image in the main scanning direction on the back side of the object to be read or the correction chart, the image correction device comprising:
 a misalignment amount calculator to, based on the front side read information of the correction chart and the back side read information of the correction chart, refer to correction chart information that indicates figures of the correction chart and calculate an amount of misalignment of read positions of the first read sensor and the second read sensor, and to generate correction information that indicates the calculated amount of misalignment; and
 a corrector to correct, using the correction information generated by the misalignment amount calculator, misalignment of images on the front side and the back side of the object to be read, indicated by the front side read information of the object to be read and the back side read information of the object to be read,
 wherein the correction chart includes, at a same position on both the front side and the back side, the figures including straight line segments parallel to a sub-scanning direction and oblique line segments inclined, with respect to the straight line segments, at a determined angle in the main scanning direction, and
 wherein the misalignment amount calculator calculates the amount of misalignment of the read positions in the sub-scanning direction from a distance between a pixel corresponding to the straight line segment of the front side read information and a pixel corresponding to the oblique line segment of the front side read information, a distance between a pixel corresponding to the straight line segment of the back side read information and a pixel corresponding to the oblique line segment of the back side read information, and an inclination angle of each of the oblique line segments.

2. The image correction device according to claim 1, wherein
 the inclination angle of the oblique line segments of the figures included in the correction chart is 45°.

3. The image correction device according to claim 1, wherein
 the figure on the front side of the correction chart is a mirror image of the figure on the back side of the correction chart, and a position of the figure on the front side corresponds to a position on the figure on the back side.

4. The image correction device according to claim 1, wherein
 the straight line segments and the oblique line segments of the correction chart are arranged as a series of segments to intersect each other and alternate between the straight line segments and the oblique line segments in the main scanning direction.

5. The image correction device according to claim 1, wherein
 the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

6. The image correction device according to claim 2, wherein
 the figure on the front side of the correction chart is a mirror image of the figure on the back side of the correction chart, and a position of the figure on the front side corresponds to a position on the figure on the back side.

7. The image correction device according to claim 2, wherein
 the straight line segments and the oblique line segments of the correction chart are arranged as a series of segments to intersect each other and alternate between the straight line segments and the oblique line segments in the main scanning direction.

8. The image correction device according to claim 3, wherein
 the straight line segments and the oblique line segments of the correction chart are arranged as a series of segments to intersect each other and alternate between the straight line segments and the oblique line segments in the main scanning direction.

9. The image correction device according to claim 6, wherein
 the straight line segments and the oblique line segments of the correction chart are arranged as a series of segments to intersect each other and alternate between the straight line segments and the oblique line segments in the main scanning direction.

10. The image correction device according to claim 2, wherein
 the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

11. The image correction device according to claim 3, wherein
 the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

12. The image correction device according to claim 4, wherein the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

13. The image correction device according to claim 6, wherein
the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

14. The image correction device according to claim 7, wherein
the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

15. The image correction device according to claim 8, wherein
the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

16. The image correction device according to claim 9, wherein
the straight line segments and the oblique line segments of the correction chart have a length so as to be included in the line of the image, in the main scanning direction on the front side of the object to be read, read by the first read sensor, and the line of the image, in the main scanning direction on the back side of the object to be read, read by the second read sensor.

17. An image correction system, comprising:
a first read sensor to read a line of an image in a main scanning direction on a front side of an object to be read or a correction chart and generate front side read information for the object to be read or the correction chart, the front side read information indicating the line of the image in the main scanning direction on the front side of the object to be read or the correction chart;
a second read sensor to read a line of an image in the main scanning direction on a back side of the object to be read or the correction chart and generate back side read information for the object to be read or the correction chart, the back side read information indicating the line of the image in the main scanning direction on the back side of the object to be read or the correction chart; and
an image correction device, wherein the image correction device comprises
a misalignment amount calculator to, based on the front side read information of the correction chart and the back side read information of the correction chart, refer to the correction chart information that indicates figures of the correction chart and calculate an amount of misalignment of read positions of the first read sensor and the second read sensor, and to generate correction information that indicates the calculated amount of misalignment,
a storage to store the correction information generated by the misalignment amount calculator, and
a corrector to correct, using the correction information stored in the storage, misalignment of images on the front side and the back side of the object to be read, indicated by the front side read information and the back side read information of the object to be read,
wherein the correction chart includes, at a same position on both the front side and the back side, the figures including straight line segments parallel to a sub-scanning direction and oblique line segments inclined, with respect to the straight line segments, at a determined angle in the main scanning direction, and
wherein the misalignment amount calculator calculates the amount of misalignment of the read positions in the sub-scanning direction from a distance between a pixel corresponding to the straight line segment of the front side read information and a pixel corresponding to the oblique line segment of the front side read information, a distance between a pixel corresponding to the straight line segment of the back side read information and a pixel corresponding to the oblique line segment of the back side read information, and an inclination angle of each of the oblique line segments.

18. The image correction system according to claim 17, wherein
the misalignment amount calculator calculates the amount of misalignment of the read positions in the main scanning direction from positions of pixels corresponding to the straight line segments of the front side read information and the back side read information.

19. An image correction method, comprising:
by a first read sensor,
reading a line of an image in a main scanning direction on a front side of an object to be read or a correction chart, and generating front side read information for the object to be read or the correction chart, the front side read information indicating the line of the image in the main scanning direction on the front side of the object to be read or the correction chart;
by a second read sensor,
reading a line of an image in a main scanning direction on a back side of the object to be read or the correction chart, and generating back side read information for the object to be read or the correction chart, the back side read information indicating the line of the image in the main scanning direction on the back side of the object to be read or the correction chart; and
by an image correction device,
based on the front side read information of the correction chart and the back side read information of the correction chart, referring to correction chart information that indicates figures of the correction chart and calculating amount of misalignment of read positions of the first read sensor and the second read sensor, and generating correction information that indicates the calculated amount of misalignment; and
correcting, using the correction information generated in the calculating of the amount of misalignment, misalignment of images on the front side and the back side of the object to be read, indicated by the front side read information of the object to be read and the back side read information of the object to be read,
wherein the correction chart includes, at a same position on both the front side and the back side, the figures including straight line segments parallel to a sub-scanning direction and oblique line segments inclined, with respect to the straight line segments, at a determined angle in the main scanning direction, and wherein the calculating of the amount of misalignment includes calculating the amount of misalignment of the read positions in the sub-scanning direction from a distance between a pixel corresponding to the straight line segment of the front side read information and a pixel corresponding to the oblique line segment of the front side read information, a distance between a pixel corresponding to the straight line segment of the back side read information and a pixel corresponding to the oblique line segment of the back side read information, and an inclination angle of each of the oblique line segments.

20. The image correction method according to claim 19, wherein the calculating of the amount of misalignment includes calculating the amount of misalignment of the read positions in the main scanning direction from positions of pixels corresponding to the straight line segments of the front side read information and the back side read information.

* * * * *